P. SHUMINSKI.
BRAKE FOR CARS.
APPLICATION FILED APR. 4, 1913.
1,104,226.
Patented July 21, 1914.
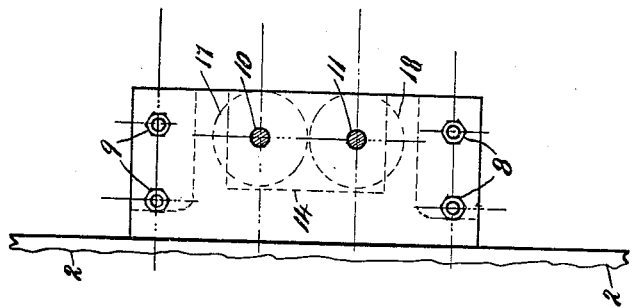
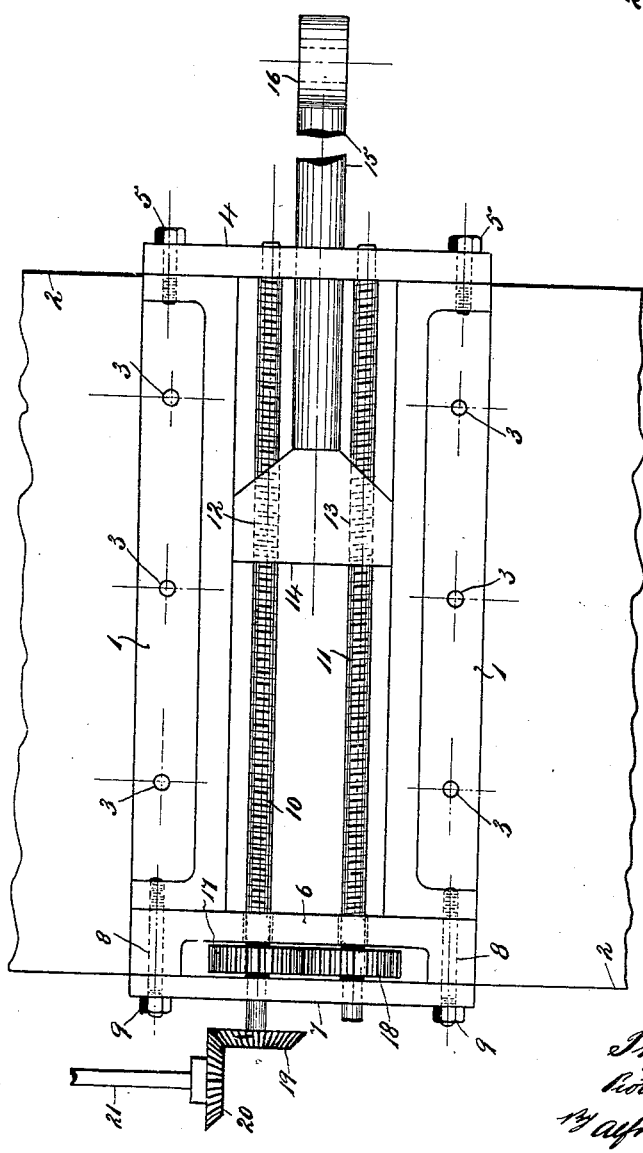

UNITED STATES PATENT OFFICE.

PIOTR SHUMINSKI, OF HAMILTON, ONTARIO, CANADA, ASSIGNOR OF ONE-FOURTH TO J. LOUIS GOLDBERG, OF HAMILTON, CANADA.

BRAKE FOR CARS.

1,104,226. Specification of Letters Patent. Patented July 21, 1914.

Application filed April 4, 1913. Serial No. 758,820.

*To all whom it may concern:*

Be it known that I, PIOTR SHUMINSKI, a subject of the Czar of Russia, residing at 127 Cannon street west, in the city of Hamilton, in the county of Wentworth, in the Province of Ontario, Dominion of Canada, have invented certain new and useful Improvements in Brakes for Cars, of which the following is a specification.

This invention relates to brakes for cars, and it has for its main object the elimination of all chain connections between the brake-strap or shoe and the means for applying same, with the result that increased efficiency is attained.

A further object of my invention is to furnish a brake for cars which is instantaneous in action when once applied.

With these and other objects in view my invention consists essentially in the novel construction, arrangement and combinations of parts hereinafter fully described illustrated on the accompanying sheets of drawings forming a part of this specification, and more particularly pointed out by the appended claim.

In the drawings, Figure 1, is an underside plan view of one convenient embodiment of my invention and as more particularly applicable to street cars. Fig. 2, is an end view of the same.

Like characters of reference designate the same or similar parts in all the figures.

As shown in the drawing, I form a box frame or casing including spaced side members 1, 1, adapted for fixture to any convenient part of the car underframe 2, by bolts passed through the holes 3, 3.

4, is the rear end piece which is rigidly secured to the side members 1, 1, by set screws or bolts 5, 5.

6, is the front end piece of channel shape and it is fitted with a covering plate 7, said parts being rigidly secured to the aforesaid side members 1, 1, by bolts 8, 8, having lock nuts 9, 9.

Journaled longitudinally of the frame or casing, I revolubly mount two screw threaded rods or shafts 10, 11, the former 10, whereof is provided with a left hand thread and the latter with a right-hand thread for example; or vice versa. These two screw-threaded rods pass through similarly threaded holes 12, 13, provided for their reception in a block 14, to which is securely attached a longitudinally extending rod 15, of appropriate cross-section passing through a hole in the aforesaid rear end piece 4. This rod 15, is formed at its free end with an eye-piece 16, to which the usual connecting rod for operating the brake-strap—not shown—is pivotally connected in any suitable manner.

17, 17, are gear wheels or arcuate toothed disks securely keyed on the screw threaded rods 10, 11, respectively, between the above referred to parts 6, 7, all of which will be readily comprehended on an examination of the drawings. To the outer or front end of one of the rods 10, 11, the former for instance I fix a miter-wheel 19, in gear with a similar wheel 20, under the control of a brake handle or lever—not shown—through the vertical shaft 21. Obviously the brake handle or lever will be mounted in the motorman's vestibule in the well known way.

From the foregoing description and accompanying drawings it will be readily seen that by my invention I provide an extremely effective and reliable device for the purpose set forth. It is also to be understood that I do not confine myself to the specific forms, arrangements and combinations of parts illustrated and described, various alterations in their shape and the arrangement thereof being possible without in any way departing from the spirit and scope of my invention, and it is intended to include all such within the present application, or as may reasonably be construed as falling within the scope of the appended claim.

Having thus set forth my invention, what I claim as new and desire to secure by Letters Patent, is:—

In a device of the character described, the combination with a pair of spaced guide members, of a cross head slidably disposed and guided therebetween, a brake actuating rod rigidly secured to said cross head centrally thereof, a pair of reversely threaded rods having threaded engagement with said cross head and disposed upon opposite sides of said brake actuating rod, a spur gear wheel carried by each of said reversely threaded rods, said gear wheels meshing with each other, and means for imparting rotation to one of said rods.

Signed at Hamilton, in the county of Wentworth, Province of Ontario, Canada, this 25th day of March, A. D. 1913.

PIOTR SHUMINSKI.

In the presence of—
ALFRED G. BRATTON,
ALFRED GOLDBERG.

Copies of this patent may be obtained for five cents each, by addressing the "Commissioner of Patents, Washington, D. C."